United States Patent [19]

Sato et al.

[11] 4,409,193

[45] Oct. 11, 1983

[54] PROCESS FOR PREPARING CUBIC BORON NITRIDE

[75] Inventors: Tadao Sato; Tadashi Endo; Osamu Fukunaga, all of Sakura; Minoru Iwata, Matsudo, all of Japan

[73] Assignee: National Institute for Researches in Inorganic Materials, Ibaraki, Japan

[21] Appl. No.: 354,354

[22] Filed: Mar. 3, 1982

[30] Foreign Application Priority Data

Mar. 6, 1981 [JP] Japan .................................. 56-32139
Mar. 20, 1981 [JP] Japan .................................. 56-40563

[51] Int. Cl.³ .............................................. C01B 21/06
[52] U.S. Cl. ..................................... 423/290; 423/279
[58] Field of Search ................................ 423/290, 276

[56] References Cited

FOREIGN PATENT DOCUMENTS 506438 6/1971 Switzerland ......................... 423/290

OTHER PUBLICATIONS

DeVries, R. C. et al., "Journ. Cryst. Growth" 1972, pp. 88-92.
Chem Abst., vol. 93, 1980, 97824c.
Journal of Material Science 14, "Precipitation Mechanism of BN in the Ternary System of B-Mg-N" Tadashi Endo, Osamu Fukunaga, Minoru Iwata (1979) 1676-1680.
Journal of Material Science 16 (1981) 2227-2232, "The Synthesis of cBN Using $Ca_3B_2N_4$", Tadashi Endo, Osamu Fukunaga, Minoru Iwata.

Primary Examiner—Brian E. Hearn
Assistant Examiner—Jackson Leeds
Attorney, Agent, or Firm—Oblon, Fisher, Spivak, McClelland & Maier

[57] ABSTRACT

A process for preparing cubic boron nitride comprises heating hexagonal boron nitride and magnesium boron nitride at a temperature of at least 1350° C. under a pressure at which the cubic boron nitride is thermodynamically stable, whereby the cubic boron having high strength and high purity can readily be obtainable. Also disclosed is a process for the preparation of magnesium boron useful as a starting material for the above process. This process comprises mixing hexagonal boron nitride and magnesium nitride or metal magnesium in a molar ratio of hexagonal boron nitride/magnesium being at least 0.6, and heating the mixture thus obtained, at a temperature of from 950° to 1250° C. under atmospheric pressure in a non-oxidizing atmosphere, e.g. a nitrogen atmosphere.

10 Claims, 7 Drawing Figures

PROCESS FOR PREPARING CUBIC BORON NITRIDE

BACKGROUND OF THE INVENTION

1. Field of the Invention

The present invention relates to a process for preparing cubic boron nitride. It relates further to a process for preparing magnesium boron nitride which is useful as a starting material for the production of the cubic boron nitride.

2. Description of the Prior Art

Cubic boron nitride, i.e. boron nitride having a cubic crystal structure, is superior in its chemical stability to diamond, although it is inferior in its hardness to diamond. For instance, it is durable in an oxidizing atmosphere at a high temperature, and its reactivity with an iron group element is extremely small. Accordingly, it exhibits substantially superior mechanical properties to those of diamond when used for grinding a heat resistant high strength material containing nickel or cobalt as the basic component, or a high speed steel. Thus, the cubic boron nitride is a quite useful substance.

It has been common to prepare the cubic boron nitride by treating hexagonal boron nitride at a high temperature under high pressure in the presence of a catalyst. As the catalyst, there have been known (1) elements belonging to Groups Ia and IIa, (2) rare earth elements, actinide elements, tin, antimony, lead, etc. (in practice, these elements are used in the form of their nitrides or alloys), and (3) urea and ammonium salts.

However, when the above-mentioned metals or alloys are used as the catalyst, unstable boron compounds and free boron are likely to form as by-products and they tend to be included in the cubic boron nitride crystals thereby obtained. The crystals thereby obtained have drawbacks such that they are blackish and opaque, and the strength of the particles is rather low.

In the case where the above-mentioned nitrides are used as the catalyst, unreacted nitrides will remain in the system, and they are likely to be trapped in the cubic boron nitride. Accordingly, it is thereby difficult to obtain cubic boron nitride crystals having high quality. Besides, the chemical reaction system is rather complicated, and it is difficult to properly set the conditions to obtain the desired crystals.

In the case where the above-mentioned urea or ammonium salts are used as the catalyst, the cubic boron nitride thereby obtained tends to have an extremely small particle size at a level of from 0.1 to 0.5 micron. Its usefulness as grinding particles will thereby be limited. Further, the mechanisms of the chemical reaction and the product formation are not yet been clearly known, and accordingly, it is not possible to set the reaction conditions to increase the particle size.

Other than the methods using such catalysts, it is known to prepare the cubic boron nitride with use of calcium boron nitride as a solvent. The cubic boron nitride thereby obtained has a high quality with a minimal content of impurities, and it is also superior in its mechanical strength. Namely, during the process of conversion of the hexagonal boron nitride to the cubic boron nitride, the calcium boron nitride serves as a solvent for the hexagonal boron nitride, and accordingly, it is possible to crystallize the cubic boron nitride from the liquid phase by the treatment at a temperature sufficiently high to solubilize both reactants, i.e. to establish a co-solubilization condition, and under a pressure required to establish a thermodynamically stable phase of the cubic boron nitride at the temperature.

However, calcium boron nitride ($Ca_3B_2N_4$) has a drawback that it is relatively unstable against moisture. For instance, when exposed in the air, it will be decomposed into a hydroxide by the moisture in the air. Accordingly, in order to maintain its desired function as the solvent, it is necessary to take special cares for its storage or at the time of filling it to the high pressure cell.

Now, with respect to a process for the preparation of magnesium boron nitride useful as a starting material for the production of the cubic boron nitride, it has been reported to form magnesium boron nitride by heating boron nitride and metal magnesium at a temperature of 1150° C. under pressure of 2.5 GP. The magnesium boron nitride obtained by the reported method, has the following X-ray diffraction peaks.

TABLE 1

Lattice spacings and intensities obtained from the major X-ray diffraction lines of the magnesium boron nitride prepared by the conventional method.

| Lattice spacings | Intensities | Lattice spacings | Intensities |
|---|---|---|---|
| 7.76 | weak | 1.68 | strong |
| 3.88 | weak | 1.65 | moderate |
| 3.02 | moderate | 1.57 | moderate |
| 2.69 | weak | 1.55 | moderate |
| 2.59 | strong | 1.49 | moderate |
| 2.44 | strong | 1.46 | moderate |
| 2.38 | weak | 1.32 | weak |
| 2.21 | strongest | 1.31 | weak |
| 2.12 | strong | 1.27 | weak |
| 1.94 | moderate | 1.22 | weak |
| 1.89 | weak | 1.19 | weak |
| 1.82 | moderate | 1.10 | weak |
| 1.75 | weak | | |

In the above relative intensities, strongest = 100, strong = 70 to 30, moderate = 30 to 10 and weak = 10 to 3.

This method has drawbacks such that high pressure is required and the productivity is poor.

SUMMARY OF THE INVENTION

Accordingly, it is an object of the present invention to provide a process for preparing cubic boron nitride, which is capable of readily producing high strength cubic boron nitride containing little impurities without the production of chemically complexed reaction products.

As a result of an extensive research, the present inventors have found that the above object can be achieved by subjecting hexagonal boron nitride and magnesium boron nitride to heat treatment at a temperature of at least 1350° C., i.e. a temperature sufficiently high to dissolve both reactants, under pressure at which the cubic boron nitride is thermodynamically stable.

Thus, the present invention provides a process for preparing cubic boron nitride, which comprises heating hexagonal boron nitride and magnesium boron nitride at a temperature of at least 1350° C. under pressure at which the cubic boron nitride is thermodynamically stable.

Another object of the present invention is to provide a process for preparing magnesium, boron nitride which is useful for the production of the cubic boron nitride.

As a result of a research with an aim to obtain magnesium boron nitride suitable as a catalyst for the synthesis of the cubic boron nitride, the present inventors have found that magnesium boron nitride having X-ray diffraction peaks are different from those of the magnesium boron nitride obtained by the above-mentioned conventional method.

Thus, the present invention also provides a process for preparing magnesium boron nitride, which comprises mixing hexagonal boron nitride and magnesium nitride or metal magnesium in a molar ratio of hexagonal boron nitride/magnesium being at least 0.6, and heating the mixture thus obtained, at a temperature of from 950° to 1250° C. under atmospheric pressure in a non-oxidizing atmosphere.

BRIEF DESCRIPTION OF THE DRAWINGS

In the accompanying drawings.

DETAILED DESCRIPTION OF THE PREFERRED EMBODIMENTS

The magnesium boron nitride to be used for the preparation of the cubic boron nitride according to the present invention, is extremely stable against moisture, and can be synthesized under atmospheric pressure. Besides, as compared with the above-mentioned calcium boron nitride, the magnesium boron nitride is superior in its function as a solvent for the hexagonal boron nitride. The conversion reaction can thereby be completed in a short period of time, and it is possible to obtain cubic boron nitride grown to have a predetermined particle size.

The magnesium boron nitride can be prepared by mixing hexagonal boron nitride and magnesium nitride or metal magnesium in a molar ratio of boron/magnesium of e.g. 2:3, and heating the mixture at a temperature of 950° to 1250° C. for 2 hours in a nitrogen stream.

For the production of cubic boron nitride according to the present invention, the magnesium boron nitride thus obtained by the above-mentioned method may be mixed with hexagonal boron nitride, or an excess amount of hexagonal boron nitride may be used for the production of the magnesium boron nitride and the product containing the excess amount of hexagonal boron nitride, thereby obtained, may be used as the starting material.

The ratio of hexagonal boron nitride to magnesium boron nitride is preferably in a range of 15:85 to 75:25 by weight. The magnesium boron nitride synthesized under atmospheric pressure undergoes a phase transformation in the pressure zone where the cubic boron nitride is produced, and forms a finer phase, i.e. a high pressure phase. However, as a result of the chemical analysis, it has been confirmed that the chemical composition in the high pressure phase is the same as that in the low pressure zone, i.e. the composition is $Mg_3B_2N_4$.

The precipitation or crystallization of the cubic boron nitride is facilitated by the solubilization of the hexagonal boron nitride in the molten state of the high pressure phase.

To obtain single crystals of the cubic boron nitride from the magnesium boron nitride and the hexagonal boron nitride, it is necessary to heat the magnesium boron nitride and the hexagonal boron nitride at a temperature of at least 1350° C., preferably from 1400° to 1600° C., i.e. a temperature at which both of them are solubilized, within the thermodynamically stable pressure zone for the cubic boron nitride, for instance, at a pressure of 50,000 atm. preferably in a range of 52,000 to 65,000 atm.

Figure 1:
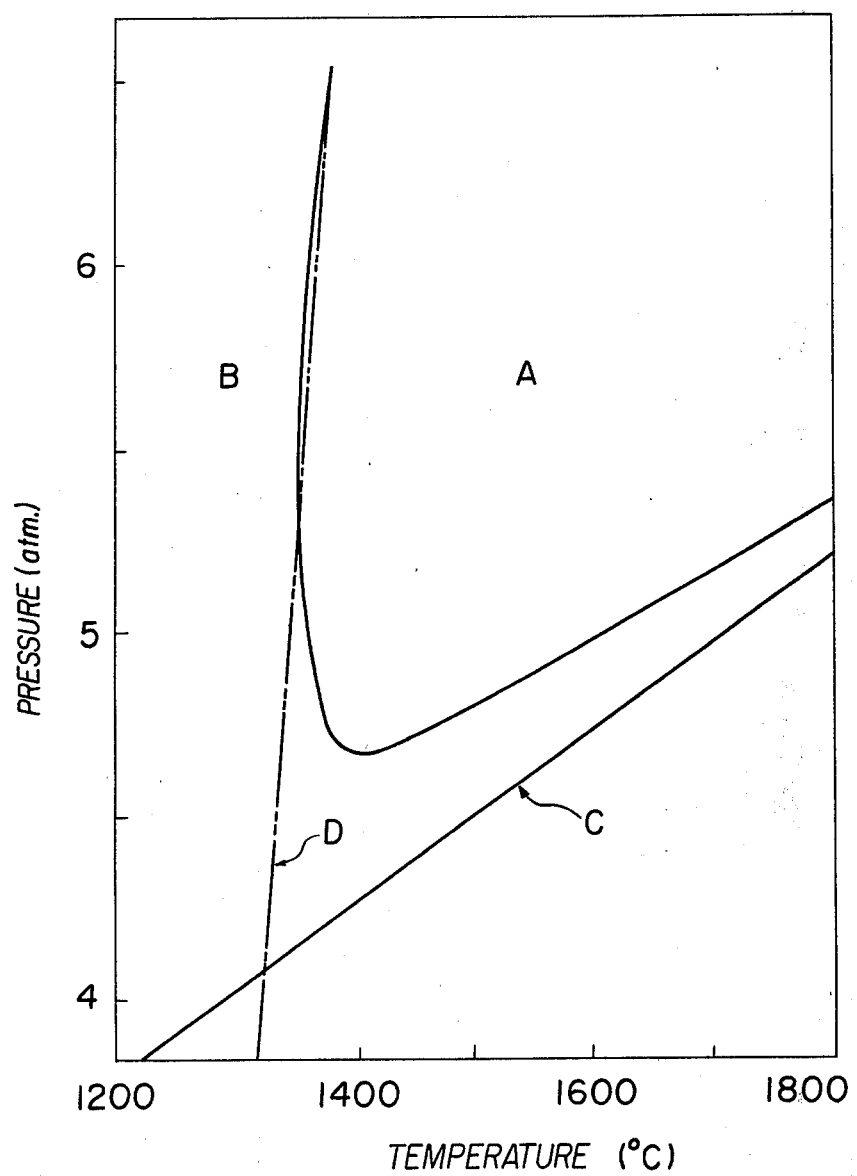
FIG. 1 is a graph showing a temperature-pressure relation to illustrate the zone within which the cubic boron nitride can be synthesized.

FIG. 1 shows the temperature-pressure conditions in the zone within which the cubic boron nitride can be formed. In the Figure, A represents the zone within with cubic boron nitride can be formed, A+B represents a zone within which the cubic boron nitride is stable, C represents an equilibrium curve for the hexagonal boron nitride and the cubic boron nitride, and D represents a co-fusion curve for the magnesium boron nitride and the boron nitride. The lower limit of the temperature for obtaining the cubic boron nitride is 1350° C.

The starting material hexagonal boron nitride preferably has high purity and contains not more than 2.0% by weight of oxygen. Accordingly, when the commercially available hexagonal boron nitride is to be used, it is preferred to heat it, for instance, at a temperature of about 2,000° C. for several hours in a nitrogen gas atmosphere under about 1 atm. to reduce the oxygen content to a level not more than 1.0% by weight.

EXAMPLE 1

Figure 2:
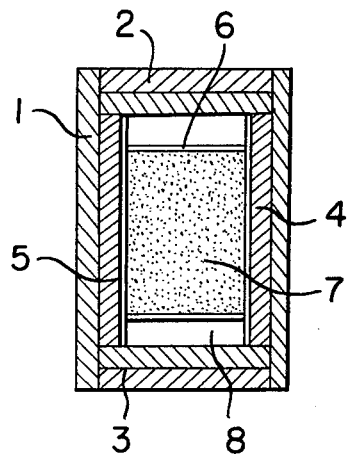
FIGS. 2, 3 and 4 are vertically cross sectional views of devices having different arrangements to be used for the process of the production of cubic boron nitride according to the present invention.
Figure 3:
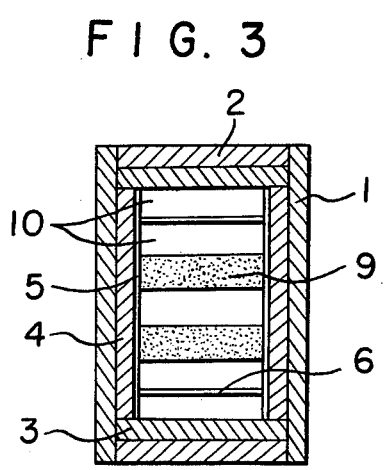
Figure 4:
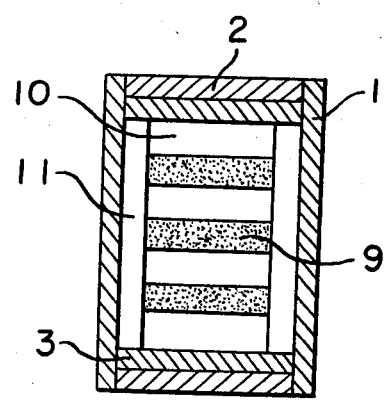

Referring to FIGS. 2, 3 and 4, reference numeral 1 designates a graphite resistance heater, numeral 2 designates a graphite disc, numeral 3 designates a sodium chloride disc, and numeral 4 designates a sodium chloride cylinder. The sodium chloride disc 3 and the sodium chloride cylinder 4 serve to keep the pressure within the reaction chamber to be constant as the sodium chloride fuses at a high temperature. Reference numeral 5 designates a molybdenum cylinder and numeral 6 designates a molybdenum disc. The molybdenum cylinder 5 and the molybdenum discs 6 constitute a container for the reactants.

About 150 mg. of magnesium boron nitride powder prepared under the atmospheric pressure and about 420 mg. of hexagonal boron nitride were adequately mixed, and the mixture thereby obtained was pressed by a tablet forming device under a pressure of about 2.0 tons/cm² to obtain a compact 7, which was then packed in the container. Reference numeral 8 is a disc made of hexagonal boron nitride, talc, pyrophyllite, silica glass or sodium chloride, and it serves to minimize the pressure and temperature variations created in the container.

Figure 5:
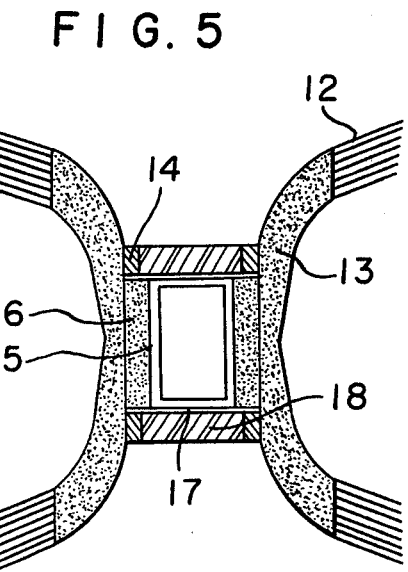
FIG. 5 is a vertically cross sectional view of a high temperature and pressure apparatus.

The reactor thus assembled was then heated at a temperature of 1450° C. under 54,000 atm. for about 15 minutes by e.g. a belt type high temperature and pressure apparatus as shown in FIG. 5. Thereafter, the heating electric power source was switched off, and the temperature within the reaction container was rapidly lowered and the pressure released, whereupon the reaction product was withdrawn. In FIG. 5, reference numeral 12 designates a paper gasket, numeral 13 designates a pyrophyllite gasket, numeral 14 designates a conductor ring, numeral 15 is a graphite resistance heater, numeral 16 is a sodium chloride cylinder, numeral 17 designates a molybdenum plate, and numeral 18 designates a zirconia disc. However, the high temperature and pressure apparatus is not limited to such a type and may be any other type so long as it is capable of maintaining the required temperature and pressure during the period of time required for the reaction.

The reaction product thus obtained was treated with a strong acid such as hydrochloric acid to dissolve magnesium boron nitride contained therein. After drying, it was subjected to heavy liquid separation, whereupon crystals of cubic boron nitride were obtained.

The yield of the cubic boron nitride was at least 85%.

The shape and size distributions of the crystals thereby obtained are rather wide. However, the maximum particle size was 120 microns, and in any case, the crystals were yellow and transparent. The pressure in this Example was applied on the basis of a load-pressure generation curve obtained by taking the phase transformation pressures of bismuth, thallium and barium to be 25.5, 37 and $55 \times 10^3$ atm, respectively. The temperature in the reaction chamber was reduced from the temperature determination curve based on the electric power applied to the graphite resistance heater prepared with use of a platinum-platinum 13% rhodium thermocouple, by a power control method.

EXAMPLE 2

With use of the arrangement shown in FIG. 3, a compact 9 prepared by pressing magnesium boron nitride by a tablet forming device under a load of about 2.0 tons/cm$^2$ and a hexagonal boron nitride disc 10 were alternately laminated and packed in the molybdenum container. The proportions of the magnesium boron nitride and the hexagonal boron nitride were about 1:3 in the weight ratio. They were reacted for about 20 minutes at a temperature of 1450° C. under 56,000 atm. The after-treatment was carried out in a manner similar to Example 1. The cubic boron nitride crystals thereby obtained were yellow and transparent, and their particle sizes were from about 80 to 120 microns. The majority of them had a shape of twin or octahedron. Although the yield was as low as 45%, crystals having irregular crystal forms were substantially reduced as compared with Example 1.

EXAMPLE 3

Instead of the sodium chloride cylinder 4 shown in FIGS. 2 and 3, a hexagonal boron nitride cylinder 11 was used to form an arrangement as shown in FIG. 4. Magnesium boron nitride 9 compacted under pressure of 2.0 tons/cm$^2$ and a hexagonal boron nitride disc 10 were alternately packed therein. They were reacted for about 20 minutes at a temperature of 1450° C. under 56,000 atm. The after-treatment was carried out in a manner similar to Example 1. The cubic boron nitride crystals were yellow and transparent, and their particle sizes were from 65 to 120 microns. The majority of them had a shape of octahedron having a smooth surface. In this method, the cubic boron nitride crystals were obtained in an amount of about 1.9 times as much because the contacting surface between hBN and magnesium boron nitride increase.

COMPARATIVE EXAMPLE

Instead of the magnesium boron nitride, calcium boron nitride was mixed with the hexagonal boron nitride and the mixture was packed in the same container as used in Example 1.

Under the same reaction conditions as in Example 1, i.e. at 1450° C., and under 54,000 atm., they were reacted for about 15 minutes.

The cubic boron nitride thereby obtained was yellow or light yellow, and it was fine transparent crystals (at most 60 microns, and the majority of them was from 30 to 40 microns).

The yield was not more than 45% and the majority remained to be hexagonal boron nitride crystals.

Now, the process for prepariinng magnesium boron nitride will be described in detail.

The hexagonal boron nitride to be used in this process may be a commercially available product. However, it is desired to heat it in a nitrogen atmosphere to remove oxides and water, before use.

The magesium nitride or metal magnesium is preferably the one which contains a minimal amount of impurities such as oxides or hydroxides. In order to readily and uniformly produce the magnesium boron nitride, the magnesium nitride or metal magnesium is preferably in the form of powder or fine particles.

The mixing ratio of the hexagonal boron nitride and the magnesium nitride or metal magnesium must be at least 0.6 in a molar ratio of BN/Mg. If the molar ratio is less than 0.6, a substantial amount of unreacted Mg$_3$N$_2$ tends to remain in the formed product, and the product will be unstable because Mg$_3$N$_2$ is susceptible to the effects of moisture in the air. The preferred range of the molar ratio is from 0.6 to 1.0. If the hexagonal boron nitride is excessive, unreacted hexagonal boron nitride will remain in the formed product. However, the hexagonal boron nitride is stable in the air, and it does not bring about unstability of the product. If the product is to be used for the above-mentioned process for the production of the cubic boron nitride, the hexagonal boron nitride present in the product may be useful as a part of the starting material for that process.

The heating temperature must be within a range of from 950° to 1250° C., preferably from 1100° to 1160° C. If the temperature is less than 950° C., the reaction does not proceed. On the other hand, if the temperature exceeds 1250° C., the decomposition and dispersion of Mg$_3$N$_2$ become vigorous, and the formed magnesium boron nitride will be decomposed and transformed into the initial hexagonal boron nitride.

The heating atmosphere must be a non-oxidizing atmosphere. In an oxidizing atmosphere, the metals will be oxidized. The reaction is carried out under atmospheric pressure.

Figure 6:
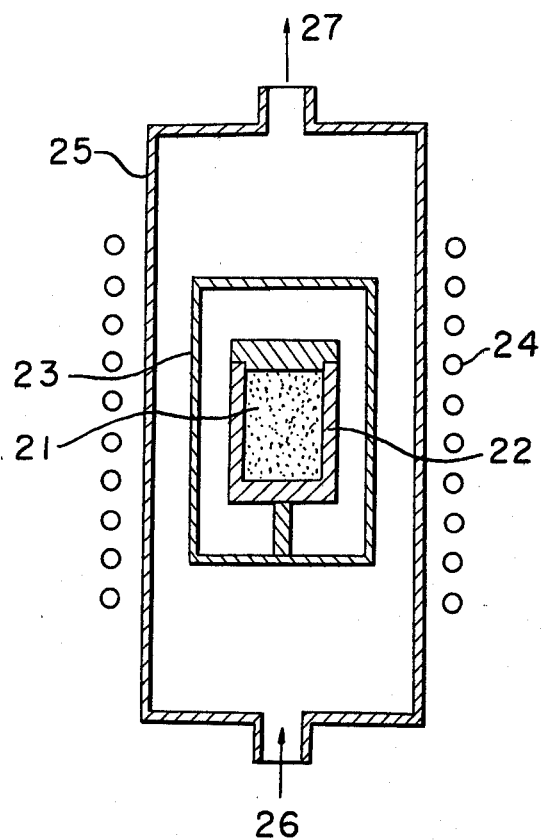
FIG. 6 is a vertically cross sectional view of the apparatus to be used for the process of the production of magnesium boron nitride according to the present invention.

As the apparatus to be used for the process of the production of magnesium boron nitride according to the present invention, there may be used, for instance, an apparatus shown in FIG. 6. In the Figure, reference numeral 21 is a mixture of the starting materials, numeral 22 is a stainless steel crucible, numeral 23 is a heater, numeral 24 is a high frequency heating coil, numeral 25 is a quartz glass tube, numeral 26 is a nitrogen gas inlet, and numeral 27 is a nitrogen gas outlet.

Figure 7:
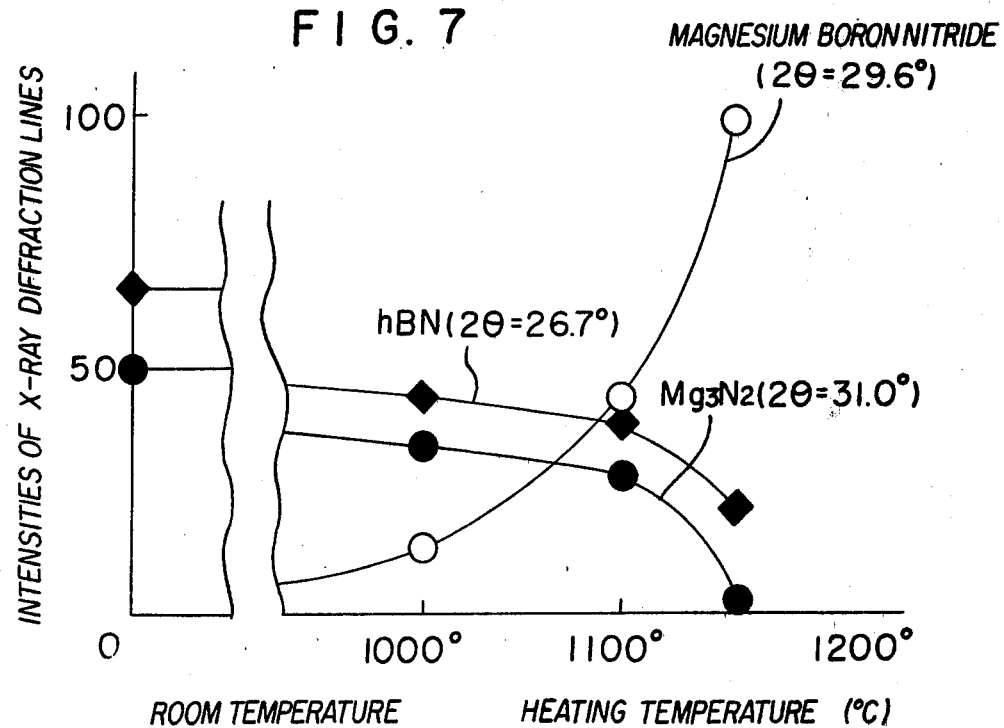
FIG. 7 is a graph showing the progress of the reaction for the formation of magnesium boron nitride as a function of the heating temperature.

The relation between the heating temperature and the progress of the reaction for the formation of the magnesium boron nitride, is as shown in FIG. 7. The hexagonal boron nitride and the magnesium nitride were mixed in a molar ratio of 2:1 and the mixture thus obtained was heated for 2 hours at the respective temperatures, whereupon the amounts of the magnesium boron nitride thereby formed and the remaining boron nitride and magnesium nitride, were respectively represented by the intensities of the X-ray diffraction lines measured with Cu-Kα and related with the heating temperatures.

As shown in the Figure, the magnesium boron nitride starts to form at a temperature around 950° C. and its formation reaches the maximum at a temperature around 1160° C.

The product thus obtained is magnesium boron nitride having a yellow colour. If unreacted $Mg_3N_2$ is present in the product, it may be removed by washing the product with water or an aqueous acid solution for a short period of time.

In the case where metal magnesium is to be used as the starting material, in order to avoid abrupt evaporation of magnesium, the heating should preferably conducted so as to gradually raise the temperature, or the temperature should initially be brought to a level of from 1000° to 1100° C. and then brought to 1150° C.

Further, it is possible to homogenize the formed magnesium boron nitride by pulverizing it and heating it.

According to the process of the present invention, it is possible to readily obtain under atmospheric pressure and in a short period of time magnesium boron nitride stable in the air and having a function as a catalyst suitable for use in the production of cubic boron nitride having a large particle size. Since the reaction is conducted at atmospheric pressure, the installation required for the production is simple, and a mass production can easily be made. Accordingly, it is possible to reduce the costs for the production.

EXAMPLE 4

Hexagonal boron nitride purified by heating at 2100° C. in a nitrogen stream and $Mg_3N_2$ powder were mixed in a molar ratio of 2:1. The mixture thus obtained was placed in a crucible, and heated for 2 hours at 1160° C. under the atmospheric pressure in a nitrogen stream, whereupon yellow powder of magnesium boron nitride was obtained. The lattice spacings obtained from the major X-ray diffraction lines thereof were as follows. This product contained a small amount of hexagonal boron nitride, but no $Mg_3N_2$ was present.

TABLE 2

| Lattice spacing | Intensities | Lattice spacing | Intensities |
| --- | --- | --- | --- |
| 8.05 | moderate | 1.84 | moderate |
| 4.01 | weak | 1.77 | strong |
| (3.33) | weak hexagonal BN (002) | 1.54 | weak |
| 3.07 | strong | 1.53 | weak |
| 3.02 | strongest | 1.48 | moderate |
| 2.67 | strong | 1.43 | weak |
| 2.44 | strong | 1.33 | moderate |
| 2.22 | weak | 1.28 | weak |
| 2.11 | weak | 1.23 | weak |
| 2.02 | moderate | 1.16 | weak |
| 2.00 | moderate | | |

The relative intensities are the same as used in Table 1.

EXAMPLE 5

Hexagonal boron nitride powder and metal magnesium grains having a grain size of about 0.5 mm were mixed in a molar ratio of 2:3. The mixture thus obtained was placed in a crucible and heated for 2 hours at 1050° C. under the atmospheric pressure in a nitrogen stream, whereupon yellow powder of magnesium boron nitride was obtained. This powder partially contained hexagonal boron nitride and $Mg_3N_2$, and therefore it was pulverized and again heated for 2 hours at 1160° C. in a nitrogen stream, whereupon pure magnesium boron nitride was obtained.

We claim:

1. A process for preparing cubic boron nitride which comprises heating hexagonal boron nitride and magnesium boron nitride at a temperature of at least 1350° C. under pressure at which the cubic boron nitride is thermodynamically stable, said magnesium boron nitride having lattice spacings obtained from the major x-ray diffraction lines thereof as designated in Table 2 of the specification.

2. The process as claimed in claim 1, in which said hexagonal boron nitride is in an amount of at least 15% by weight relative to the magnesium boron nitride.

3. The process as claimed in claim 1, in which the temperature is within a range of from 1400° to 1600° C.

4. The process as claimed in claim 1, 2 or 3, in which the pressure is 47,000 atm or higher.

5. The process as claimed in claim 1, 2 or 3, in which the hexagonal boron nitride has an oxygen content of not more than 2.0% by weight.

6. A process for preparing magnesium boron nitride which comprises mixing hexagonal boron nitride and magnesium nitride or metal magnesium in a molar ratio of hexagonal boron nitride/magnesium being at least 0.6, and heating the mixture thus obtained, at a temperature of from 950° to 1250° C. under atmospheric pressure in a non-oxidizing atmosphere.

7. The process as claimed in claim 6, in which said molar ratio is within a range of from 0.6 to 1.0.

8. The process as claimed in claim 6, in which the temperature is within a range of from 1100° to 1160° C.

9. The process as claimed in claim 6, 7 or 8, in which the non-oxidizing atmosphere is a nitrogen atmosphere.

10. A process for preparing cubic boron nitride which comprises:
    (a) preparing magnesium boron nitride by mixing hexagonal boron nitride and magnesium nitride or metal magnesium in a molar ratio of hexagonal boron nitride/magnesium of at least 0.6, and heating the mixture thus obtained at a temperature of from 950° to 1250° C. under atmospheric pressure in a non-oxidizing atmosphere, and
    (b) heating hexagonal boron nitride and said magnesium boron nitride from (a) at a temperature of at least 1350° C. under a pressure at which cubic boron nitride is thermodynamically stable.

* * * * *